United States Patent
Bernasconi

(10) Patent No.: US 8,942,518 B2
(45) Date of Patent: Jan. 27, 2015

(54) FLEXIBLE OPTICAL MODULATOR FOR ADVANCED MODULATION FORMATS

(71) Applicant: Alcatel-Lucent USA, Inc., Murray Hill, NJ (US)

(72) Inventor: Pietro Bernasconi, Genestrerio (CH)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 13/785,145

(22) Filed: Mar. 5, 2013

(65) Prior Publication Data

US 2013/0251302 A1 Sep. 26, 2013

Related U.S. Application Data

(60) Provisional application No. 61/606,590, filed on Mar. 5, 2012.

(51) Int. Cl.
  G02F 1/035 (2006.01)
  G02B 6/28 (2006.01)
  G02F 1/01 (2006.01)
  H04B 10/516 (2013.01)
  G02B 6/293 (2006.01)

(52) U.S. Cl.
  CPC ............ G02F 1/0115 (2013.01); H04B 10/516 (2013.01); G02B 6/29386 (2013.01)
  USPC ................................................. 385/3; 385/24

(58) Field of Classification Search
  USPC .......................................................... 385/3
  See application file for complete search history.

(56) References Cited

U.S. PATENT DOCUMENTS

| 6,453,086 | B1 * | 9/2002 | Tarazona ......................... 385/20 |
| 7,272,271 | B2 | 9/2007 | Kaplan et al. |
| 2001/0024543 | A1 | 9/2001 | Ahmadvand et al. |
| 2003/0123878 | A1 | 7/2003 | Li et al. |
| 2005/0175288 | A1 * | 8/2005 | Chen et al. ....................... 385/48 |
| 2007/0071453 | A1 | 3/2007 | Liu et al. |

(Continued)

FOREIGN PATENT DOCUMENTS

| DE | 202006007966 U1 | 8/2006 |
| EP | 1975693 B1 | 12/2009 |
| EP | 2453295 A1 | 5/2012 |

OTHER PUBLICATIONS

Goh, Takashi, et al., "Novel Flexible-Format Optical Modulator with Selectable Combinations of Carrier Numbers and Modulation Levels Based on Silica-PLC and LiNbO3 Hybrid Integration," Optical Fiber Communication Conference. Optical Society of America, 2011, 3 pages.

(Continued)

*Primary Examiner* — Omar R Rojas
(74) *Attorney, Agent, or Firm* — Hitt Gaines, PC

(57) ABSTRACT

An apparatus comprising a cascaded set of deinterleavers. A first optical deinterleaver is configured to receive a first optical signal and a second optical signal. A second optical deinterleaver is configured to receive the second optical signal and a first optical output of the first optical deinterleaver. A third optical deinterleaver is configured to receive a second optical output of the first optical deinterleaver. The apparatus comprises an optical power splitter configured to provide the second optical signal received by the first optical deinterleaver and by the second optical deinterleaver.

19 Claims, 6 Drawing Sheets

(56) References Cited

U.S. PATENT DOCUMENTS

2012/0106888 A1     5/2012   Goh et al.
2012/0195544 A1     8/2012   Shen et al.

OTHER PUBLICATIONS

Yamazaki, Hiroshi, et al., "Modulation-Level-Selectable Optical Modulator with a Hybrid Configuration of Silica PLCs and LiNbO3 Phase Modulators," Proc. ECOC2010, We 8 (2010), 3 pages.

Yamazaki, Hiroshi, et al., "Flexible-Format Optical Modulators with a Hybrid Configuration of Silica Planar Lightwave Circuits and LiNbO3 Phase Modulators," NTT Technical Review, vol. 9, No. 4, 2011, 7 pages.

Takahashi, Hiroshi, "High Performance Planar Lightwave Circuit Devices for Large Capacity Transmission," European Conference and Exposition on Optical Communications, Optical Society of America, 2011, 8 pages.

\* cited by examiner

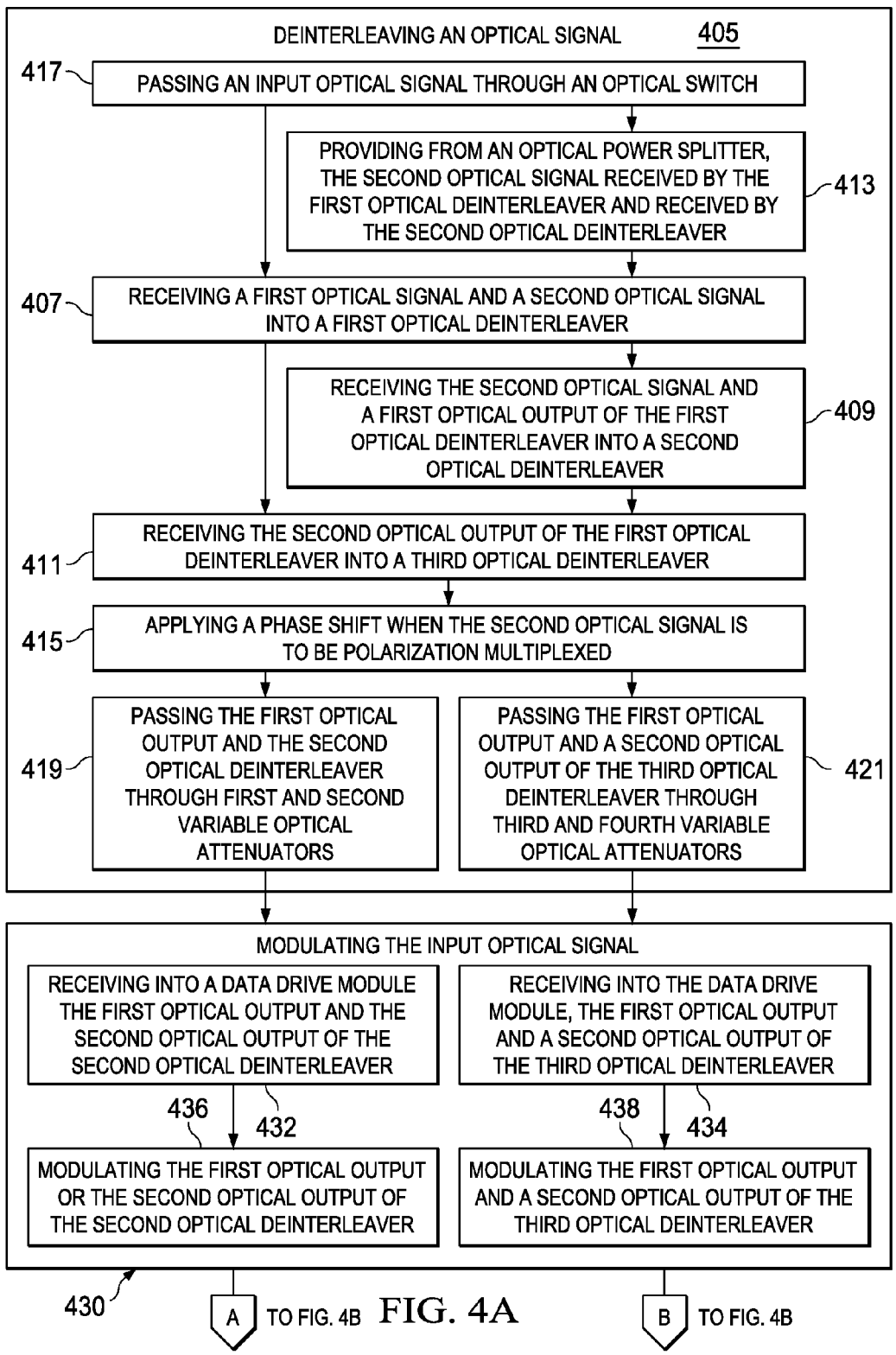

FLEXIBLE OPTICAL MODULATOR FOR ADVANCED MODULATION FORMATS

CROSS-REFERENCE TO RELATED APPLICATION

This application claims the benefit of U.S. Provisional Application Ser. No. 61/606,590, filed by Pietro Bernasconi on Mar. 5, 2012, entitled, "FLEXIBLE OPTICAL MODULATOR FOR ADVANCED MODULATION FORMATS," and related to U.S. patent application Ser. No. 13/785,231 filed on Mar. 5, 2013, entitled, "FLEXIBLE OPTICAL MODULATOR FOR ADVANCED MODULATION FORMATS FEATURING OPTICAL COUPLERS WITH ASYMMETRIC POWER SPLITTING", both commonly assigned with this application and both incorporated herein by reference in their entirety.

TECHNICAL FIELD

This application is directed, in general, to optical communications systems and methods.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Conventional optical modulators using different advanced modulation formats are typically implemented using discrete different components configured to perform one form of optical modulation. However, these discrete components can be bulky and expensive, and, mechanically unstable and difficult to control, when assembled in a final package (e.g., when mounted on a same circuit board).

SUMMARY OF ILLUSTRATIVE EMBODIMENTS

One embodiment is an apparatus comprising a cascaded set of deinterleavers. A first optical deinterleaver is configured to receive a first optical signal and a second optical signal. A second optical deinterleaver is configured to receive the second optical signal and a first optical output of the first optical deinterleaver. A third optical deinterleaver is configured to receive a second optical output of the first optical deinterleaver. The apparatus comprises an optical power splitter configured to provide the second optical signal received by the first optical deinterleaver and by the second optical deinterleaver.

In some such embodiments, the apparatus includes first and second variable optical attenuators configured to receive a first optical output and a second optical output of the second optical deinterleaver, respectively, and, third and fourth variable optical attenuators configured to receive a first optical output and a second optical output of the third optical deinterleaver. In some such embodiments, the first optical deinterleaver, and, one of the second optical deinterleaver or the third optical deinterleaver is reconfigurable via an applied, controllable $\pi/2$ phase to switch the optical outputs. Some such embodiments further include a control module configured to cause a $\pi/2$ phase shift to be applied to the first optical deinterleaver, and, one of the second optical deinterleaver or the third optical deinterleaver. Any such embodiments include an optical switch configured to receive an input optical signal and to switch the optical input signal. The optical input signal serves as the first optical signal when the optical input signal is to be modulated according to a single-polarization multiplexed format, or, the second optical signal when the optical input signal is to be modulated according to a polarization multiplexed format. In any such embodiments of the apparatus the input optical signal includes either four different carrier wavelengths, or, two different carrier wavelengths. In some such embodiments, the first, second and third optical deinterleavers each include at least a single-stage filter (e.g., a single-stage Mach-Zehnder interferomer). In some such embodiments, the first, second and third optical deinterleavers each include at least a double-staged filter (e.g., a multi-stage Mach-Zehnder interferomer). In some such embodiments, a first stage filter of each of the deinterleavers sends separate optical output signals to respective pairs of second stage filters of each of the deinterleavers.

Another embodiment is a system comprising an input apparatus that ludes the cascaded set of deinterleavers and the optical power splitter, and, the data drive module. The data drive module is configured to receive the first optical output and the second optical output of the second optical deinterleaver, and, the first optical output and a second optical output of the third optical deinterleaver.

Some such embodiments of the system include a control module configured to cause a $\pi/2$ phase shift to be applied to the first optical deinterleaver, and, to one of the second optical deinterleaver or the third optical deinterleaver. In any such embodiments, the input apparatus can includes an optical switch configured to receive an optical input signal and to switch the optical input signal. The optical input signal is switched to serve as the first optical signal when the optical input signal is to be modulated according to a single-polarization multiplexed format, or, serve as the second optical signal when the optical input signal is to be modulated according to a polarization multiplexed format. In any such embodiments, switching the optical input signal by the optical switch is controlled by a control module. In any such embodiments, the data drive module is further configured to modulate the first optical output and the second optical output of the second optical deinterleaver, and, the first optical output and a second optical output of the third optical deinterleaver with data signals to produce corresponding data-modulated optical output signals. Any such embodiments of the apparatus further include an output apparatus configured to receive data-modulated optical output signals corresponding to the first optical output and the second optical output of the second optical deinterleaver, and, the first optical output and a second optical output of the third optical deinterleaver, respectively. Any such embodiments of the output apparatus further include first and second phase shifters configured to receive the data-modulated first optical output and the data-modulated second optical output of the second optical deinterleaver, respectively. Any such embodiments of the output apparatus further include third and fourth phase shifters configured to receive the data-modulated first optical output and the data-modulated second optical output of the third optical deinterleaver, respectively. In some such embodiments, the first and second phase shifters are configured to transfer the data-modulated first optical output and the data-modulated second optical output of the second optical deinterleaver to first and second variable optical attenuators of the output apparatus, respectively. In some such embodiments, the third and fourth phase shifters are configured to transfer the data-modulated first optical output and the data-modulated second optical output of the third optical deinterleaver to third and fourth variable optical attenuators of the output apparatus, respectively. Any such embodiments of the output apparatus further include a half-wave plate configured to receive the data-modulated first optical output and the data-modulated second optical output of the second optical deinterleaver, after passing through the first and second phase shifters, respectively. Any such embodiments of the output apparatus further include one or more optical power combiners configured to combine carrier wavelengths in one or more of the data-modulated first optical output and the data-modulated second optical output of the second optical deinterleaver or the data-modulated first optical output and the data-modulated second optical output of the third optical deinterleaver after passing through phase shifters, respectively.

Another embodiment is a method comprising deinterleaving an input optical signal. Deinterleaving includes receiving a first optical signal and a second optical signal into a first optical deinterleaver. Deinterleaving includes receiving the second optical signal and a first optical output of the first optical deinterleaver into a second optical deinterleaver. Deinterleaving includes receiving the second optical output of the first optical deinterleaver into a third optical deinterleaver. Deinterleaving includes providing from an optical power splitter the second optical signal received by the first optical deinterleaver and received by the second optical deinterleaver.

In some such embodiments deinterleaving further includes applying, applying a controllable $\pi/2$ phase shift through the first optical deinterleaver, and, applying a controllable $\pi/2$ phase shift to one of the second or third optical deinterleavers.

BRIEF DESCRIPTION OF THE DRAWINGS

Reference is now made to the following descriptions taken in conjunction with the accompanying drawings, in which:

FIGS. 4a and 4B present flow diagrams illustrating a method of the disclosure, e.g., a method using any embodiments of the apparatuses or systems discussed in the context of FIGS. 1-3.

In the Figures and text, similar or like reference symbols indicate elements with similar or the same functions and/or structures.

In the Figures, the relative dimensions of some features may be exaggerated to more clearly illustrate one or more of the structures or features therein.

Herein, various embodiments are described more fully by the Figures and the Detailed Description. Nevertheless, the inventions may be embodied in various forms and are not limited to the embodiments described in the Figures and Detailed Description of Illustrative Embodiments.

DETAILED DESCRIPTION

The description and drawings merely illustrate the principles of the inventions. It will thus be appreciated that those skilled in the art will be able to devise various arrangements that, although not explicitly described or shown herein, embody the principles of the inventions and are included within its scope. Furthermore, all examples recited herein are principally intended expressly to be for pedagogical purposes to aid the reader in understanding the principles of the inventions and concepts contributed by the inventor(s) to furthering the art, and are to be construed as being without limitation to such specifically recited examples and conditions. Moreover, all statements herein reciting principles, aspects, and embodiments of the inventions, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

One objective is to provide various embodiments that can perform different optical modulation formats using the same optical components. Using common optical components to perform different forms of optical modulation facilitates the use of smaller, more stable, and less expensive integrated apparatus. The disclosed apparatus thereby removes most of the above-mentioned problems associated with the present use of discrete components. Additionally, the ability to dynamically change modulation formats for a deployed apparatus adds an additional degree of flexibility of optical linking capacity to the optical networks according to fluctuating needs.

Figure 1:
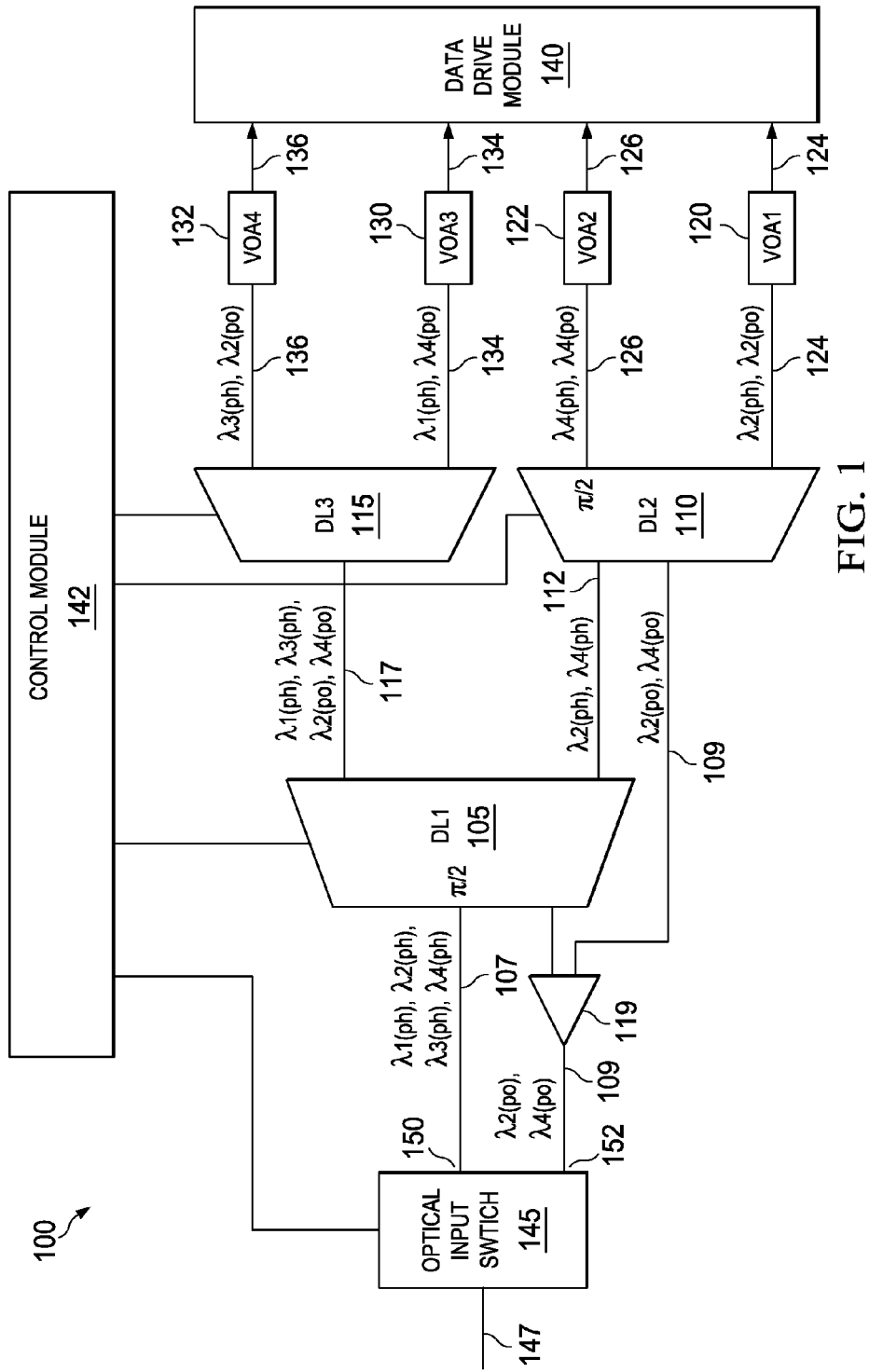
FIG. 1 presents a schematic view of an embodiment of an apparatus of the disclosure.

FIG. 1 presents a schematic view of an embodiment of an apparatus 100 of the disclosure. In some cases, the apparatus 100 can be part of, or be, a planar lightwave circuit (PLCs) e.g., an input PLC. In some cases, components of the apparatus 100 (e.g., the deinterleavers and other components coupled to the deinterleavers) can integrate components formed on, and in some cases from, the same substrate (e.g., a lithium niobate substrate, silicon substrate or other optical grade semiconductor substrates). As non-limiting examples, in some embodiments, the apparatus 100 can be provided on a single substrate as an input PLC occupying an area of about $17 \times 6$ mm$^2$ or about $22 \times 7$ mm$^2$.

The term deinterleaver as used herein refers to any optical device capable of separating the spectrum of an optical input stream into two output streams, each one carrying a spectrum including one set of optical frequencies (e.g., a comb of optical frequencies). The two sets of optical frequencies are interleaved in the optical input stream.

As illustrated in FIG. 1 the apparatus 100 comprises a cascaded set 102 of deinterleavers. The cascaded set 102 of deinterleavers are configured as carrier separation filters to separate the carrier wavelength of the sets of wavelengths of light carried by the first and second optical signals 107, 109.

The cascaded set 102 of deinterleavers includes a first optical deinterleaver (DL) 105 configured to receive a first optical signal 107 and a second optical signal 109. The set 102 includes second optical deinterleaver 110 configured to receive the second optical signal 109 and a first optical output 112 of the first optical deinterleaver 105. A third optical deinterleaver 115 configured to receive a second optical output 117 of the first optical deinterleaver 105. The apparatus 100 also comprises an optical power splitter 119 configured to provide the second optical signal 109 received by the first optical deinterleaver 105 and by the second optical deinterleaver 110.

One skilled in the pertinent arts would understand that the deinterleavers 105, 110, 115 can be optically coupled to each other via light guiding structures. As illustrated, the optical power splitter 119 divides the second input optical signal 109 into two parts. In some cases the optical power splitter 119 is a 3 dB power splitter.

Some embodiments of the apparatus 100 further include variable optical attenuators (VOA). For instance, as further illustrated in FIG. 1, first and second variable optical attenuators 120, 122 can be configured to receive a first optical output 124 and a second optical output 126 of the second optical deinterleaver 110, respectively. Third and fourth variable optical attenuators 130, 132 can be configured to receive a first optical output 134 and a second optical output 136 of the third optical deinterleaver 115.

In some embodiments, for example, the variable optical attenuators can be or include Mach-Zehnder filters under thermo-optical control as well known to those skilled in the pertinent arts. In some cases positioning variable optical attenuators 120, 122, 130, 132 before the data drive module 140 helps to reduce possible power imbalances among the data signals. In other cases, e.g., if power asymmetry is not a concern, then variable optical attenuators may not be used. In other embodiments the variable optical attenuators may be alternatively placed after the data drive module 140.

In some embodiments of the apparatus 100, the first and second optical signals 107, 109 can carry different sets of wavelengths of light that are separated from each other by cascaded set 102 before being modulated. For instance, in some cases, the first optical signal 107 carries four wavelengths λ1(ph), λ2(ph), λ3(ph), λ4(ph) to be modulated with a constant polarization. For instance, in some cases, the second optical signal 109 carries two different carrier wavelengths λ1(po), λ2(po) to be modulated and eventually to be recombined with a shifted polarization.

In the latter case, an additional phase change to the two carrier wavelengths λ1(po), λ2(po) may be required. For instance, in cases where the apparatus 100 is configured to carry two different carrier wavelengths λ1(po), λ2(po), the first optical deinterleaver 105, and, one of the second optical deinterleaver or the third optical deinterleaver (e.g., the second deinterleaver 110 in FIG. 1), can be reconfigured through an applied, controllable (e.g., fixed π/2) phase shift so to redirect the optical signals (107, 109) to the correct output ports (e.g., so to effectively invert the two optical outputs).

For instance, in some cases, a control module 142 can be configured to trigger the phase shift depending upon which set of carrier wavelength are to be passed through the apparatus 100. In some embodiments the control module 142 (e.g., an integrated circuit) is configured to apply a control signal 143 to the deinterleavers 105, 110 to affect the phase shift depending upon which of the optical signals 107, 109 is to be received by the apparatus 100. In some cases, e.g., the control module 142 is configured to cause a π/2 phase shift to be applied to the first optical deinterleaver 105, and, one of the second optical deinterleaver 110 or the third optical deinterleaver 115.

FIG. 1 shows example pathways traveled by both sets of carriers, (λ1(ph), λ2(ph), λ3(ph), λ4(ph) and λ1(po), λ2(po)), through the apparatus 100. One skilled in the pertinent arts would understand that these are example alternative carrier sets traveling through the apparatus 100, e.g., at different times depending upon which set is selection.

In some embodiments, the apparatus 100 further includes an optical switch 145 to facilitate such carrier set selection. In some cases optical switch 145 can be an optical space switch or similar switch familiar to those skilled in the pertinent arts. The optical switch 145 configured to receive an input optical signal 147 (e.g., from a single optical fiber line) and to switch the optical input signal 147 to one of two states. In some cases, the optical switch 145 switches the optical input signal 147 to serve (e.g., by being directed through a first port 150) as the first optical signal 107 when the optical input signal 147 is to be modulated according to a single-polarization multiplexed format. In some cases, the optical switch 145 switches the optical input signal 147 to serve (e.g., by being directed through a second port 150) as the second optical signal 109 when the optical input signal 147 is to be a polarization multiplexed format.

In some embodiments the input optical signal 147 includes either four different carrier wavelengths (or channels) λ1(ph), λ2(ph), λ3(ph), λ4(ph), or, two different carrier wavelengths λ1(po), λ2(po). Without limitation the wavelengths can correspond to any of optical wavelengths used in telecommunications, e.g., C, L, or S optical wavelength bands, or combinations thereof. Without limitation, in some embodiments, the four different carrier wavelengths can be spaced apart by 14 or 28 GHz increments, or, the two different carrier wavelengths can be spaced apart by 28 or 56 GHz increments.

By selecting the first port 150, the four carrier set is demultiplexed (e.g., separated and split), and then, via the data drive module 140, wavelength multiplexed. Alternatively, by selecting the second port 152, the two carrier set is demultiplexed (e.g., separated and split), and then, via the data drive module 140, polarization wavelength multiplexed.

In some embodiments, the port 150, 152 selected using optical switch 145 is controlled (e.g., via a signal 155) by the control module 142, depending upon which of the optical signals 107, 109 is to be receive by the apparatus 100. In some cases, the control module 142 be configured to dynamically switch optical switch 145, depending on whether the input optical signal 147 carries four wavelengths or two wavelengths. For instance, when the input optical signal 147 carries four wavelengths, the control module 142 may be programmed to actuate the switch 145 to send the signal 147 through the first port 150 and serve as the first optical signal 107. For instance, when the input optical signal 147 carries two wavelengths, the control module 142 may be programmed to actuate the switch 145 to send the signal 147 through the second port 152 and serve as the second optical signal 109, and, cause the phase shift to be applied in the deinterleaver 105, 110.

Figure 2:
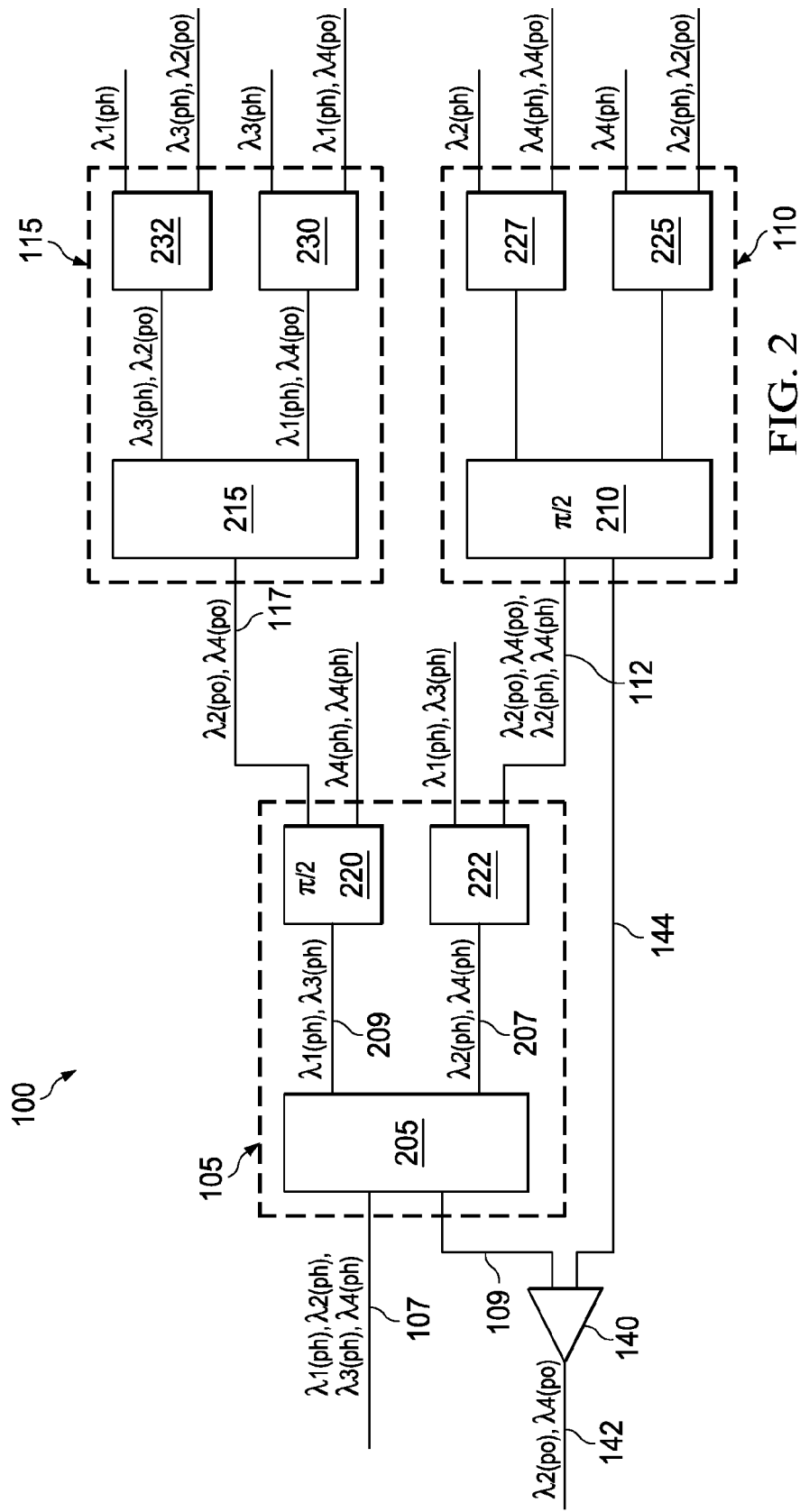
FIG. 2 presents a detailed schematic view of one embodiment of the apparatus disclosed in FIG. 1.

FIG. 2 presents a detailed schematic view of one embodiment of the apparatus 100 disclosed in FIG. 1. As illustrated, in some embodiments, the first, second and third optical deinterleavers 105, 110, 115 each include at least a single-stage Mach-Zehnder filter 205, 210, 215, respectively. For instance, in some such embodiments, the Mach-Zehnder filter 205 of the first optical deinterleaver 105 is configured to send the first optical output 112 to the Mach-Zehnder filter 210 of the second optical deinterleaver 110, and, to send the second optical output 117 to the Mach-Zehnder filter 215 of the second optical deinterleaver 115. In some such embodiments, each of the Mach-Zehnder filters 205, 210, 215 have an effective free spectral range of 28 GHz). In some such embodiments, each of the Mach-Zehnder filters 205, 210, 215 can be tuned or controlled with one or a pair of phase-shifters (e.g., thermoptic phase shifters) and in some case the phase-shifter or phase-shifter can be used to apply the π/2 phase shift. In some such embodiments, the Mach-Zehnder filters 205, 210, 215 filters provide at least 20 dB, more preferably at least about 30 dB of isolation between nearest-neighbor carrier wavelengths (e.g., the isolations between any of λ1(ph) and λ2(ph), λ2(ph) and λ3(ph), λ3(ph) and λ4(ph), or, λ1(po) and λ2(po)).

As further illustrated in FIG. 2, in some embodiments to provide for better isolation, the first, second and third optical deinterleavers 105, 110, 115 each include at least double-staged Mach-Zehnder filters. For instance, in some such embodiments, a first-stage Mach-Zehnder filter 205, 210, or 215 of each of the deinterleavers 105, 110, 115 sends separate optical output signals 207, 209; 212, 214; 217, 219 to respective pairs of second-stage Mach-Zehnder filter 220, 222; 225, 227; 230, 232 of each of the deinterleavers 105, 110, 115. As illustrated, in some cases one of the second-stage Mach-Zehnder filters of the first deinterleaver 105 (e.g., filter 220) can be configured via an applied phase shift ($\pi/2$) and the first stage Mach-Zehnder filter 210 of the second deinterleaver 110 can be reconfigured via an applied phase shift ($\pi/2$). Alternatively, when the other one of the second-stage Mach-Zehnder filters of the first deinterleaver 105 (e.g., filter 222) is reconfigured the applied phase shift ($\pi/2$) then the first stage Mach-Zehnder filter 215 of the third deinterleaver 115 can be configured via an applied phase shift ($\pi/2$). Based upon the present disclosure one skilled in the pertinent art would understand that embodiments of the deinterleavers could include any number, and different numbers of, Mach-Zehnder filters in various nested and staged combinations familiar to those skilled in the pertinent art.

Figure 3:
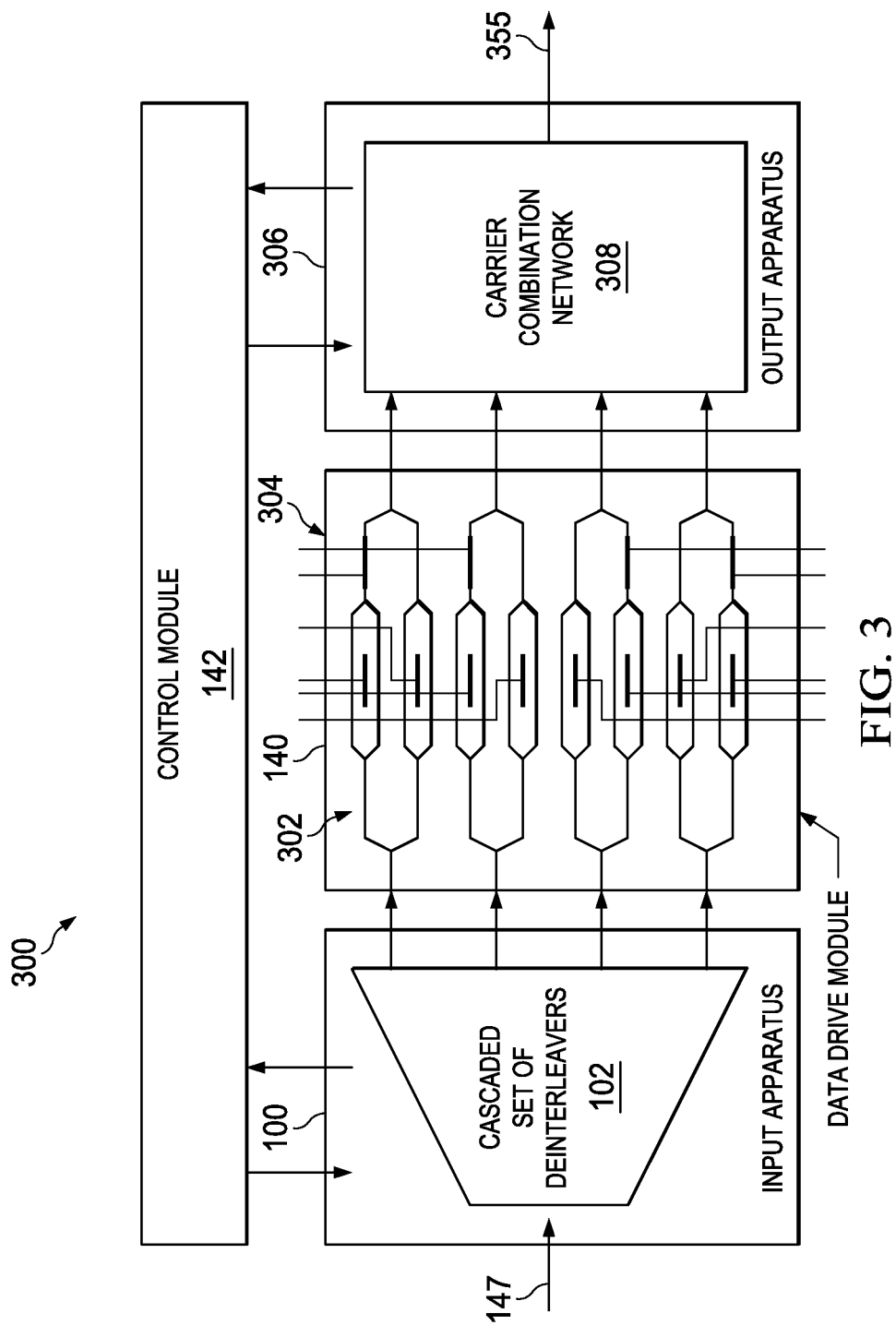
FIG. 3 presents a block diagram of a system of the disclosure that includes the apparatus of the disclosure, such as any of the apparatuses depicted in FIGS. 1-2.

Another embodiment of the disclosure is a system, e.g., an optical communication system. FIG. 3 presents a block diagram of a system 300 of the disclosure that includes the apparatus, such as any embodiments of the apparatuses 100 discussed in the context of FIGS. 1-2. For instance, in some cases the apparatus 100 can be an input apparatus configured as an input planar lightwave circuit.

With continuing reference to FIG. 1, the system 300 comprises an input apparatus 100 that includes the cascaded set 102 of deinterleavers 105, 110, 115 and the power splitter 119, and a data drive module 140. As discussed in the context of FIG. 1, the first optical deinterleaver 105 is configured to receive a first optical signal 107 and a second optical signal 109. The second optical deinterleaver 110 configured to receive the second optical signal 109 and a first optical output 112 of the first optical deinterleaver 105. The third optical deinterleaver 115 is configured to receive a second optical output 117 of the first optical deinterleaver 105. The optical power splitter 119 is configured to provide the second optical signal 109 received by the first optical deinterleaver 105 and by the second optical deinterleaver 110.

The data drive module 140 is configured to receive the first optical output 124 and the second optical output 126 of the second optical deinterleaver 110, and, the first optical output 134 and a second optical output 136 of the third optical deinterleaver 115. Each one of the carrier wavelengths in the optical output 124, 126, 134, 136 is independently modulated in the data drive module 140 and eventually recombined as further discussed herein.

As illustrated in FIG. 3, some embodiments of the data drive module 140 can include arrays of nested Mach-Zehnder modulators 302, e.g., fabricated on a lithium niobate substrate 304 or other optical grade substrates. In some embodiments the data drive module 140 is a lithium niobate optical chip.

One skilled in the pertinent arts would be familiar with the procedures to encode data (e.g. binary data) into the carrier wavelengths in the optical output 124, 126, 134 136 (referred to herein a data-modulated output signals 124', 126', 134', 136') received from the input apparatus 100, e.g. by binary phase shift keying or on-off keying, quadrature phase-shift keying, or other keying protocols familiar to those skilled in the pertinent arts.

As further illustrated in FIG. 3 some embodiments of the system 300 further include an output apparatus 306. In some embodiments the output apparatus 306 can be or include an output planar lightwave circuit. As a non-limiting example in some embodiments the output apparatus 306 can be provided on a single substrate as an output PLC occupying an area of about 16×4 mm$^2$.

The output apparatus 306 is configured to receive the data-modulated optical output signals 124', 126', 134', 136' from the drive module 140, and, recombine the same carriers as initially received as the input optical signal 147, using a carrier combination network 308. The data-modulated optical output signals 124', 126', 134', 136' correspond to the first optical output 124 and the second optical output 126 of the second optical deinterleaver 110, and, the first optical output 134 and a second optical output 136 of the third optical deinterleaver 115, respectively.

Figure 3A:
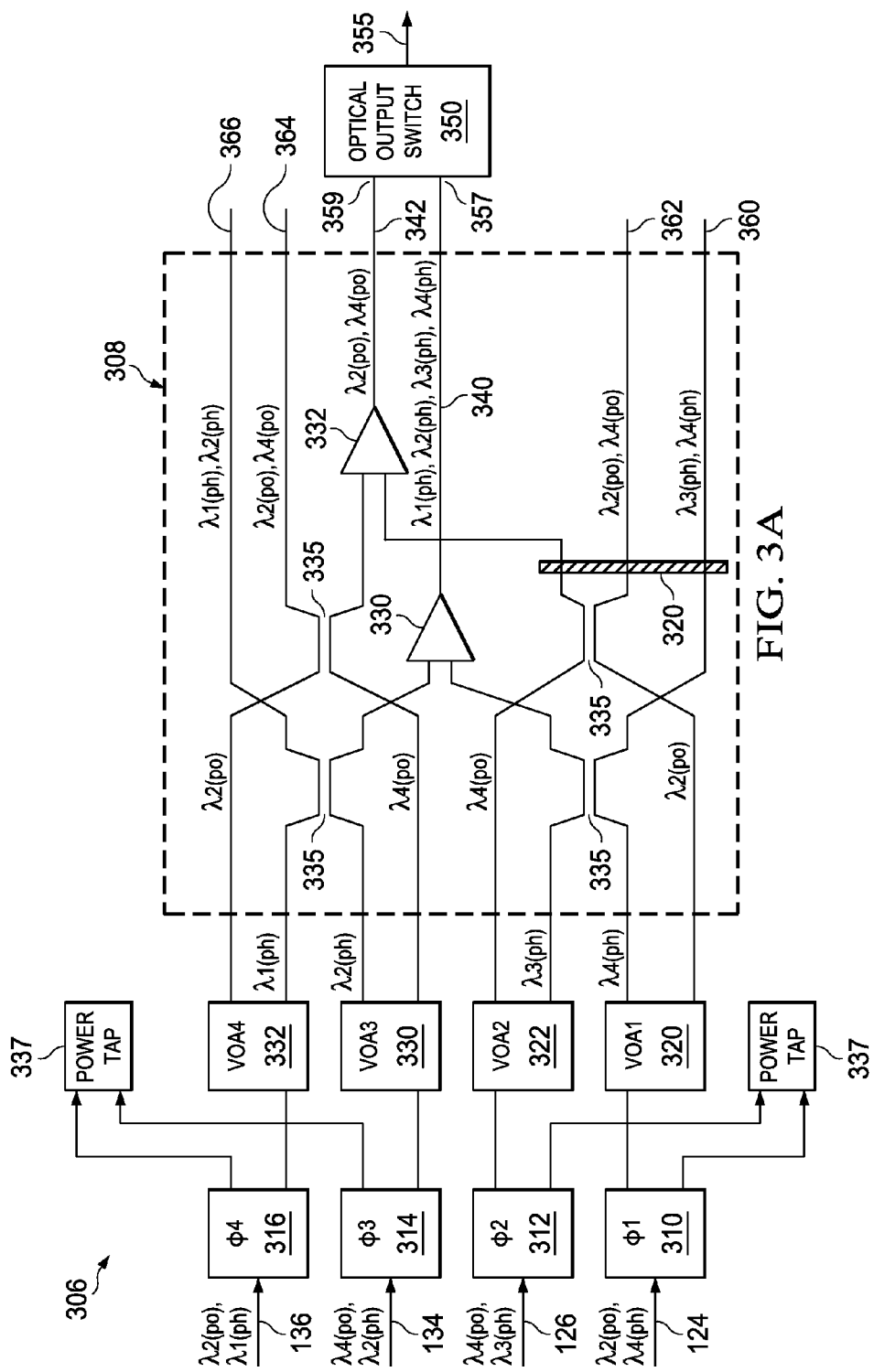
FIG. 3A presents a detailed schematic view of one embodiment of the output apparatus disclosed in FIG. 3.

To present additional aspects of the output apparatus 306, FIG. 3A presents a detailed schematic view of one embodiment of the output apparatus disclosed in FIG. 3

As further illustrated in FIG. 3A, some embodiments of the output apparatus 306 include phase shifters ($\Phi$) and variable optical attenuators (VOAs) to optically align the output signals 124', 126', 134', 136' before being recombined.

For instance, as further illustrated in FIG. 3A, in some embodiments, first and second phase shifters ($\Phi$) 310, 312 configured to receive the data-modulated first optical output 124' and the data-modulated second optical output 126' of the second optical deinterleaver 110, respectively. For instance, third and fourth phase shifters 314, 316 configured to receive the data-modulated first optical output 134' and the data-modulated second optical output 136' of the third optical deinterleaver 115, respectively.

For instance, as further illustrated in FIG. 3A, in some embodiments, the first and second phase shifters 310, 312 transfer the data-modulated first optical output 124' and the data-modulated second optical output 126' of the second optical deinterleaver 110 to first and second variable optical attenuators 320, 322 of the output apparatus 300, respectively. For instance, third and fourth variable optical attenuators 330, 332 receive the data-modulated second optical output 136' of the third optical deinterleaver 115 from third and fourth phase shifters 314, 316 from of the output apparatus 300, respectively. In other embodiments of the system 300, as discussed in the context of FIG. 1, variable optical attenuators 120, 122, 130, 132 are located on the input apparatus 100 and not on the output apparatus 306.

As further illustrated in FIG. 3A, some embodiments of the output apparatus 306 include a half-wave plate 320 configured to receive the data-modulated first optical output 124' and the data-modulated second optical output 126' of the second optical deinterleaver 110, after passing through the first and second phase shifters 310, 312, respectively.

The half-wave plate 320 is preferably applied in polarization multiplexed applications, e.g., when the second port 152 of the input optical switch 145 is selected and data drive module 140 generated data suitable for polarization multiplexed format to be transported be the two carrier wavelengths $\lambda 1(po)$, $\lambda 2(po)$ so that each polarization component of the two wavelengths carries independent data streams for a total of four, independent data streams.

By appropriate selection of the recombination sequence in the carrier combination network 308, which includes optical power combiners 330, 332, 2×2 couplers 335, and power taps 337, the same arrangement of carriers can be provided to output ports 357, 359 as initially received as the input optical signal 147. For instance, one or more optical power combiners 330, 332 of the output apparatus 306 can be configured to combine carrier wavelengths in one or more of the data-modulated first optical output 124' and the data-modulated second optical output 126' of the second optical deinterleaver 110 or the data-modulated first optical output 134' and the data-modulated second optical output 136' of the third optical deinterleaver 115 after passing through phase shifters 310, 312, 314, 316, respectively. For instance, as illustrated in FIG. 3A the initial four carriers can be combined (λ1(ph), λ2(ph), λ3(ph), λ4(ph) in a single-polarization multiplexed fashion as primary optical output signal 340 and the initial two carriers λ1(po), λ2(po) can be combined in a polarization multiplexed fashion at primary optical output signal 342.

As further illustrated the output apparatus 300 can include an optical switch or power combiner 350 to combine the two primary output signal 340, 342 to provide a single output optical signal 355 carrying the data modulated output 124', 126' 134' 136'. For instance is some embodiments the control module 142 can be configured to cause the output optical signal 355 to receive the optical signals from one of the ports 357, 359 in conjunction with the control of the input optical switch 145 or π/2 phase shifts to the deinterleavers 105, 110, 115 as discussed in previously herein.

In some cases, one or more of the optical signals in the secondary optical output signals 360, 362, 364, 366 can be used to monitor (e.g., by the control module 142) for optical carrier wavelength shifts e.g., due to changes in ambient temperature, and the control module 142 can cause appropriate corrections to the input apparatus 100 and data drive module 140.

Figure 4B:
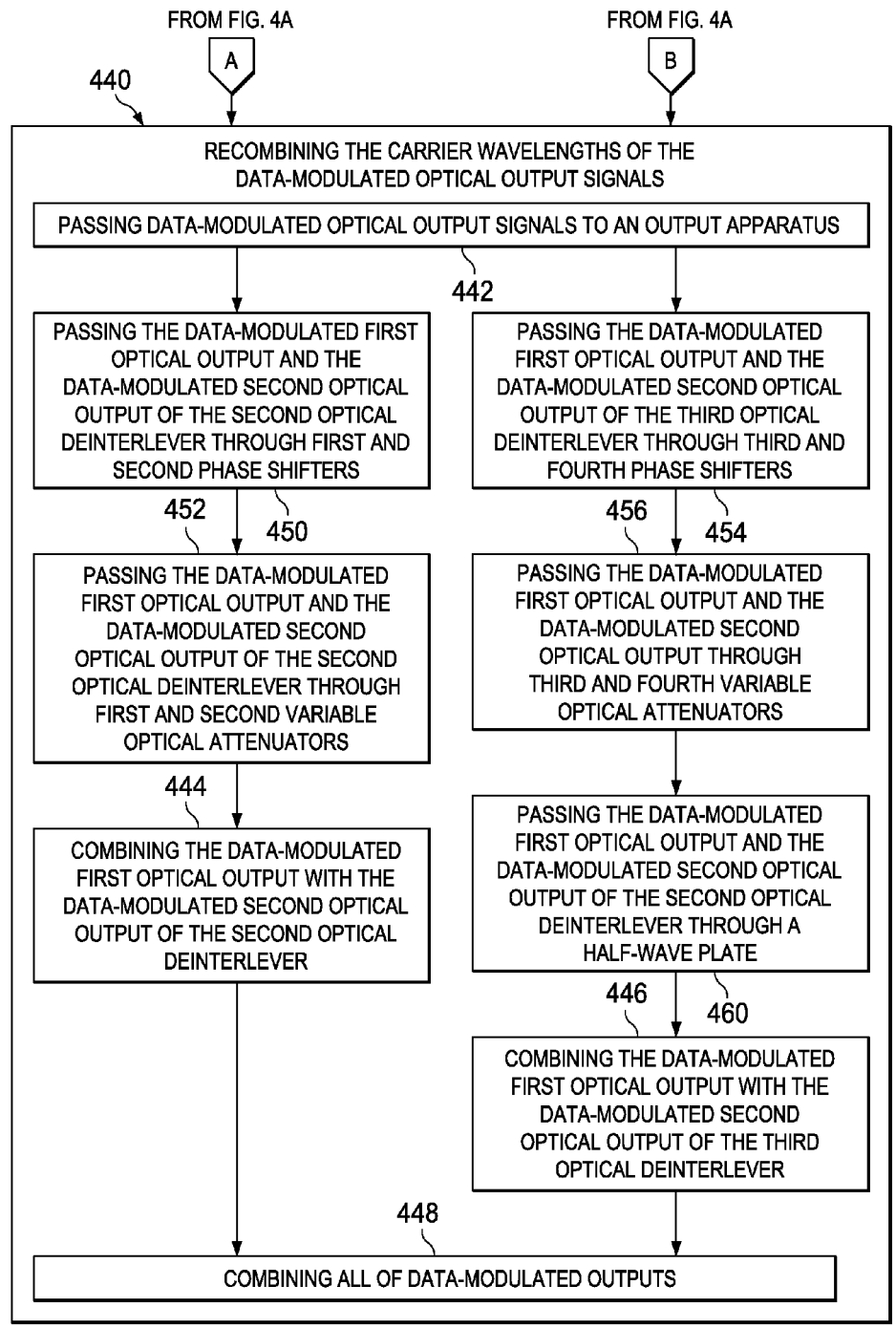

Another embodiment is a method. FIGS. 4a and 4B present flow diagrams illustrating a method 400 of the disclosure, e.g., a method using any embodiments of the apparatus 100 or system 300 discussed in the context of FIGS. 1-3. With continuing reference to FIGS. 1-4B, the method 400 comprises a step 405 of deinterleaving an optical signal 147. Deinterleaving (step 405) includes a step 407 of receiving a first optical signal 107 and a second optical signal 109 into a first optical deinterleaver 105. Deinterleaving (step 405) includes a step 409 of receiving the second optical signal 109 and a first optical output 112 of the first optical deinterleaver 105 into a second optical deinterleaver 110. Deinterleaving (step 405) includes a step 411 of receiving the second optical output 117 of the first optical deinterleaver 105 into a third optical deinterleaver 115. Deinterleaving (step 405) includes a step 413 of providing, from an optical power splitter 119, the second optical signal 109 received by the first optical deinterleaver 105 and received by the second optical deinterleaver 110.

In some embodiments, deinterleaving (step 405) further includes a step 415 of applying, through the first optical deinterleaver 105, and, one of the second or the third optical deinterleavers 110, 115, a controllable phase shift (e.g., a π/2 shift controlled by control module 142) to the respective received optical signals (107, 109), e.g., when the second optical signal 109 is to be modulated according to a polarization multiplexed format.

In some embodiments, deinterleaving (step 405) further includes a step 417 of passing the input optical signal 147 through an optical switch 145 (e.g., an optical switch 145 actuable via the control module 142). Actuating the switch 145 is such that the optical input signal 147 either: serves as the first optical signal 107 when the optical input signal 147 is to be modulated according to a single-polarization multiplexed format, or, serves as the second optical signal 109 when the optical input signal 147 is to be modulated according to a polarization multiplexed format.

In some embodiments deinterleaving (step 405) further includes a step 419 of passing the first optical output 124 and the second optical output 126 of the second optical deinterleaver 110 through first and second variable optical attenuators 120, 122. In some embodiments deinterleaving (step 405) further includes a step 421 of passing the first optical output 134 and a second optical output 136 of the third optical deinterleaver 115 through third and fourth variable optical attenuators 124, 126. For instance steps 419, 421 can be performed before data-modulating these output in data drive module 140.

Some embodiments of the method 400 further include a step 430 of modulating the input optical signal 147. Modulating (step 430) includes a step 432 of receiving into a data drive module 140 the first optical output 124 and the second optical output 126 of the second optical deinterleaver 110. Modulating (step 430) includes a step 434 of receiving into the data drive module 140, the first optical output 134 and a second optical output 136 of the third optical deinterleaver 115. Modulating (step 430) includes a step 436 of modulating the first optical output 124 or the second optical output 126 of the second optical deinterleaver 110 with a data (e.g., binary) signal applied by the data drive module 140 to form data-modulated first optical output 124' and data-modulated second optical output 126' of the second optical deinterleaver 110. Modulating (step 430) includes a step 438 of modulating the first optical output 134 and a second optical output 136 of the third optical deinterleaver 115 with the data signal to form data-modulated first optical output 134' and data-modulated second optical output 136' of the third optical deinterleaver 115.

Some embodiments of the method 400 further include a step 440 of recombining the carrier wavelengths of the data-modulated optical output signals 124', 126', 134', 136'.

Recombining (step 440) includes a step 442 of passing data-modulated optical output signals 124', 126', 134', 136' to an output apparatus 306.

Recombining (step 440) includes a step 444 of combining the data-modulated first optical output 124' with the data-modulated second optical output 126' of the second optical deinterleaver 110, and step 446 of combining the data-modulated first optical output 134' with the data-modulated second optical output 136' of the third optical deinterleaver 115, and then a step 448 of combining all of data-modulated outputs 124', 126', 134', 136' with each other, e.g., at output signals 340 and 342.

In some embodiments it is desirable to achieve tributary alignment of these optical output signals before recombination in steps 444-448.

For instance, in some embodiments, after passing step 442, recombining (step 440) can include a step 450 of passing the data-modulated first optical output 124' and the data-modulated second optical output 126' of the second optical deinterleaver 110 through first and second phase shifters 310, 312, and in some cases, a step 452 of passing the data-modulated first optical output 124' and the data-modulated second optical output 126' of the second optical deinterleaver 110 through first and second variable optical attenuators 320, 322. For instance, in some embodiments, after passing step 442, recombining (step 440) can include a step 454 of passing the data-modulated first optical output 134' and the data-modulated second optical output 136' of the third optical deinterleaver 115 through third and fourth phase shifters 314, 316, and in some cases a step 456 of passing the data-modulated first optical output 134' and the data-modulated second optical output 136' through third and fourth variable optical attenuators 330, 332.

In some embodiments, recombining (step 440) includes a step 460 of passing the data-modulated first optical output 124' and the data-modulated second optical output 126' of the second optical deinterleaver 110 through a half-wave plate 320. Those skilled in the art to which this application relates will appreciate that other and further additions, deletions, substitutions and modifications may be made to the described embodiments.

What is claimed is:

1. An apparatus comprising:
   a cascaded set of deinterleavers including:
      a first optical deinterleaver configured to receive a first optical signal and a second optical signal;
      a second optical deinterleaver configured to receive the second optical signal and a first optical output of the first optical deinterleaver;
      a third optical deinterleaver configured to receive a second optical output of the first optical deinterleaver;
   an optical power splitter configured to provide the second optical signal received by the first optical deinterleaver and by the second optical deinterleaver; and
   an optical switch configured to receive an input optical signal and to switch the optical input signal, either to:
      serve as the first optical signal when the optical input signal is to be modulated according to a single-polarization multiplexed format, or,
      serve as the second optical signal when the optical input signal is to be modulated according to a polarization multiplexed format.

2. The apparatus of claim 1, further including:
   first and second variable optical attenuators configured to receive a first optical output and a second optical output of the second optical deinterleaver, respectively, and
   third and fourth variable optical attenuators configured to receive a first optical output and a second optical output of the third optical deinterleaver.

3. The apparatus of claim 1, wherein the first optical deinterleaver, and, one of the second optical deinterleaver or the third optical deinterleaver, is reconfigured via an applied, controllable $\pi/2$ phase to switch the optical outputs.

4. The apparatus of claim 1, further including a control module configured to cause a $\pi/2$ phase shift to be applied to the first optical deinterleaver, and, one of the second optical deinterleaver or the third optical deinterleaver.

5. The apparatus of claim 1, wherein the input optical signal includes either:
   four different carrier wavelengths, or, two different carrier wavelengths.

6. The apparatus of claim 1, wherein the first, second and third optical deinterleavers each include at least a single-staged Mach-Zehnder filter.

7. An apparatus, comprising:
   a cascaded set of deinterleavers including:
      a first optical deinterleaver configured to receive a first optical signal and a second optical signal;
      a second optical deinterleaver configured to receive the second optical signal and a first optical output of the first optical deinterleaver;
      a third optical deinterleaver configured to receive a second optical output of the first optical deinterleaver; and
   an optical power splitter configured to provide the second optical signal received by the first optical deinterleaver and by the second optical deinterleaver, wherein the first, second and third optical deinterleavers each include at least a double-staged Mach-Zehnder filter, wherein:
   a first-stage Mach-Zehnder filter of each of the deinterleavers sends separate optical output signals to subsequent pairs of second-stage Mach-Zehnder filters of each of the deinterleavers.

8. A system, comprising:
   an input apparatus, including:
      a cascaded set of deinterleavers including:
         a first optical deinterleaver configured to receive a first optical signal and a second optical signal;
         a second optical deinterleaver configured to receive the second optical signal and a first optical output of the first optical deinterleaver; and
         a third optical deinterleaver configured to receive a second optical output of the first optical deinterleaver; and
      an optical power splitter configured to provide the second optical signal received by the first optical deinterleaver and by the second optical deinterleaver; and
   a data drive module configured to receive a first optical output and a second optical output of the second optical deinterleaver, and, a first optical output and a second optical output of the third optical deinterleaver.

9. The system of claim 8, further including a control module configured to cause a $\pi/2$ phase shift to be applied to the first optical deinterleaver, and, to one of the second optical deinterleaver or the third optical deinterleaver.

10. The system of claim 8, wherein the input apparatus further includes an optical switch configured to receive an optical input signal and to switch the optical input signal, to either:
    serve as the first optical signal when the optical input signal is to be modulated according to a single-polarization multiplexed format, or,
    serve as the second optical signal when the optical input signal is to be modulated according to a polarization multiplexed format.

11. The system of claim 8, wherein switching the optical input signal by the optical switch is controlled by a control module.

12. The system of claim 8, wherein the data drive module is further configured to modulate the first optical output and the second optical output of the second optical deinterleaver, and, the first optical output and a second optical output of the third optical deinterleaver with data signals to produce corresponding data-modulated optical output signals.

13. The system of claim 8, further including an output apparatus configured to receive data-modulated optical output signals corresponding to the first optical output and the second optical output of the second optical deinterleaver, and, the first optical output and a second optical output of the third optical deinterleaver, respectively.

14. The system of claim 13, wherein the output apparatus further includes:
    first and second phase shifters configured to receive the data-modulated first optical output and the data-modulated second optical output of the second optical deinterleaver, respectively; and
    third and fourth phase shifters configured to receive the data-modulated first optical output and the data-modulated second optical output of the third optical deinterleaver, respectively.

15. The system of claim 14, wherein:
    the first and second phase shifters transfer the data-modulated first optical output and the data-modulated second optical output of the second optical deinterleaver to first and second variable optical attenuators of the output apparatus, respectively; and
    the third and fourth phase shifters receive the data-modulated first optical output and the data-modulated second optical output of the third optical deinterleaver from third and fourth variable optical attenuators of the output apparatus, respectively.

16. The system of claim 14, wherein the output apparatus further includes a half-wave plate configured to receive the data-modulated first optical output and the data-modulated second optical output of the second optical deinterleaver, after passing through the first and second phase shifters, respectively.

17. The system of claim 10, further including:
one or more optical power combiners configured to combine carrier wavelengths in one or more of the data-modulated first optical output and the data-modulated second optical output of the second optical deinterleaver or the data-modulated first optical output and the data-modulated second optical output of the third optical deinterleaver after passing through phase shifters, respectively.

18. A method, comprising:
deinterleaving an input optical signal including:
  passing the input optical signal through an optical switch wherein the optical switch is configured to receive the input optical signal and to switch the optical input signal, either to:
    serve as a first optical signal when the optical input signal is to be modulated according to a single-polarization multiplexed format, or,
    serve as a second optical signal when the optical input signal is to be modulated according to a polarization multiplexed format
  receiving the first optical signal and the second optical signal into a first optical deinterleaver;
  receiving the second optical signal and a first optical output of the first optical deinterleaver into a second optical deinterleaver;
  receiving a second optical output of the first optical deinterleaver into a third optical deinterleaver; and
  providing from an optical power splitter the second optical signal received by the first optical deinterleaver and received by the second optical deinterleaver.

19. The method of claim 18, wherein deinterleaving further includes applying a controllable $\pi/2$ phase shift through the first optical deinterleaver, and, applying a controllable $\pi/2$ phase shift to one of the second or third optical deinterleavers.

* * * * *